United States Patent [19]

Powell

[11] Patent Number: 4,584,788
[45] Date of Patent: Apr. 29, 1986

[54] POSITIVE TRIGGER TRAP

[76] Inventor: Charles Powell, 2100 Washington St., Vicksburg, Miss. 39180

[21] Appl. No.: 600,017

[22] Filed: Apr. 13, 1984

[51] Int. Cl.[4] ............................................ A01M 23/26
[52] U.S. Cl. ........................................ 43/88; 43/92
[58] Field of Search ...................... 164/85, 88, 91, 92

[56] References Cited

U.S. PATENT DOCUMENTS 1,005,667 10/1911 Steffens ..................................... 43/92
1,467,832 9/1923 Booth ....................................... 43/88
2,475,687 7/1949 Baker ....................................... 43/92

Primary Examiner—Gene P. Crosby
Attorney, Agent, or Firm—Hall, Myers & Rose

[57] ABSTRACT

A trap having a tubular housing with front and back ends, and jaws pivotally attached near the front end of the housing which are released by a positive pull trigger and a release mechanism therefor. The jaws are connected to an elongated U-shaped yoke which is driven by a spring for closing the jaws.

21 Claims, 13 Drawing Figures

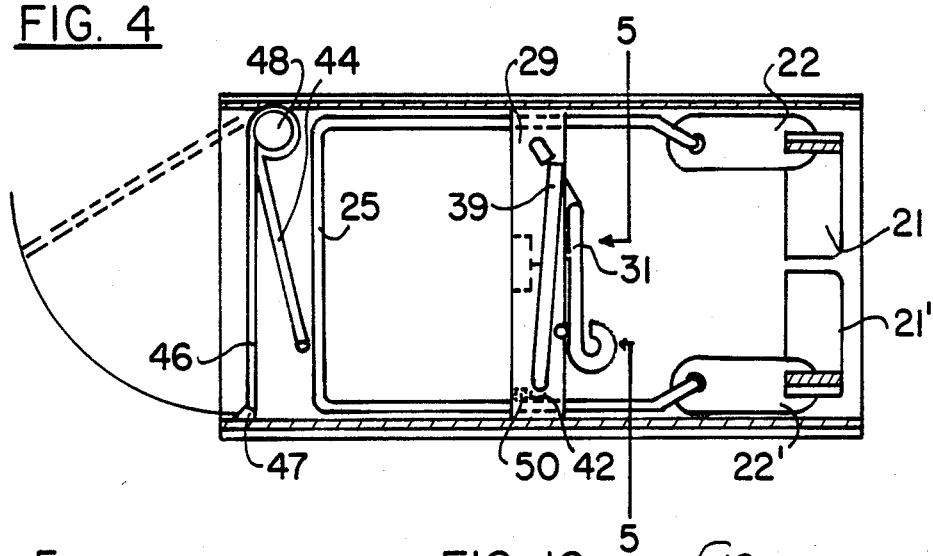
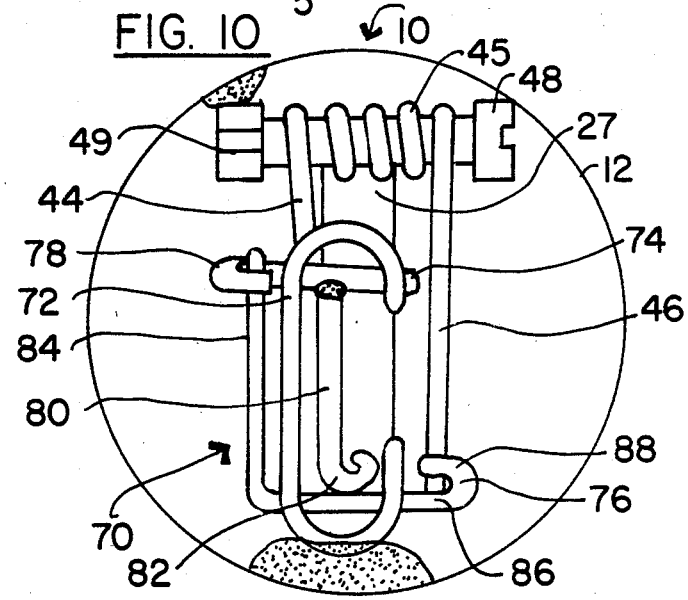
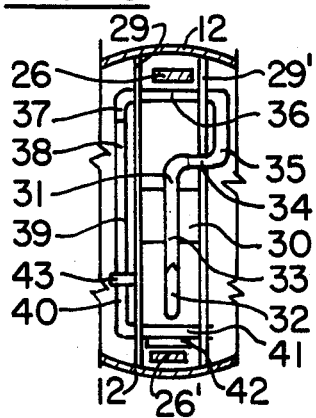
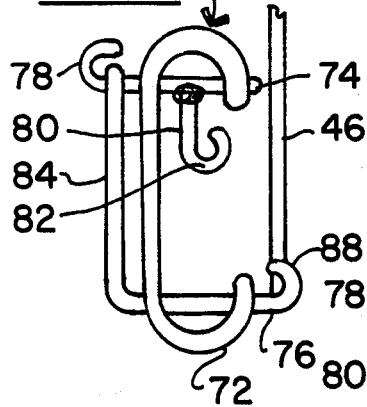
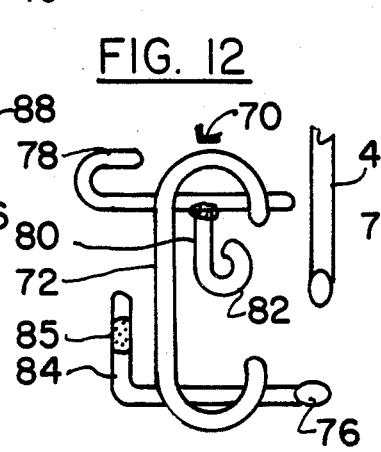
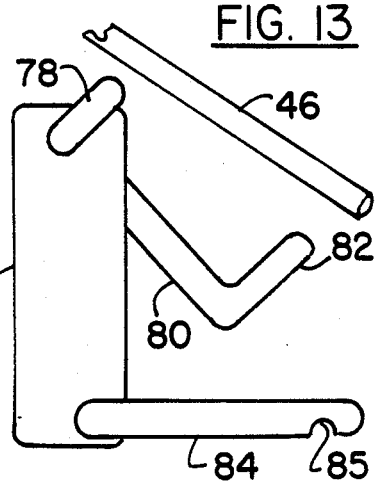

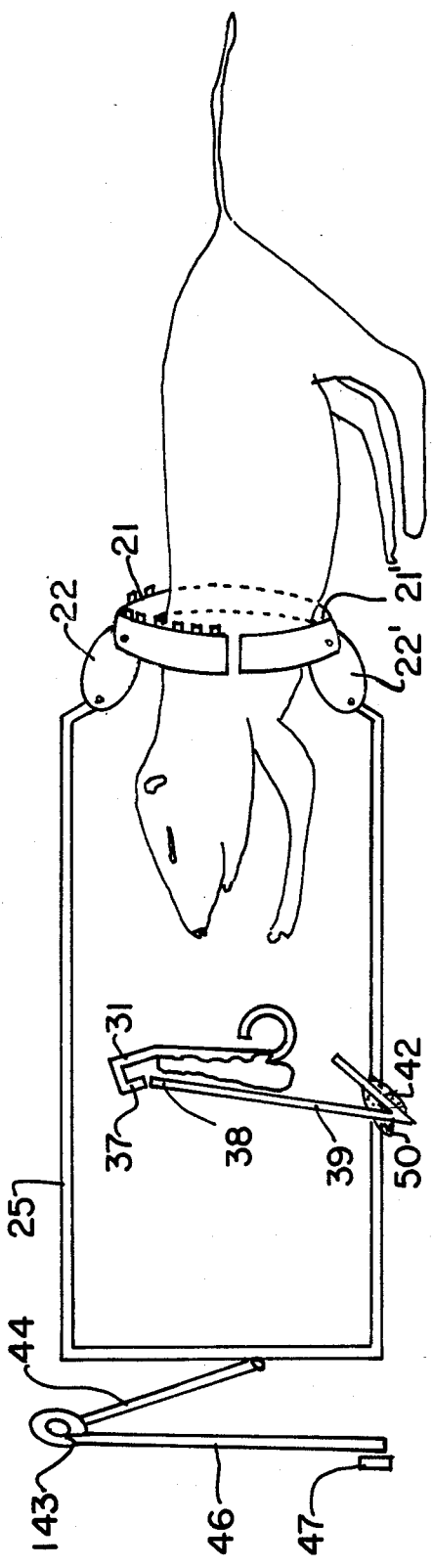
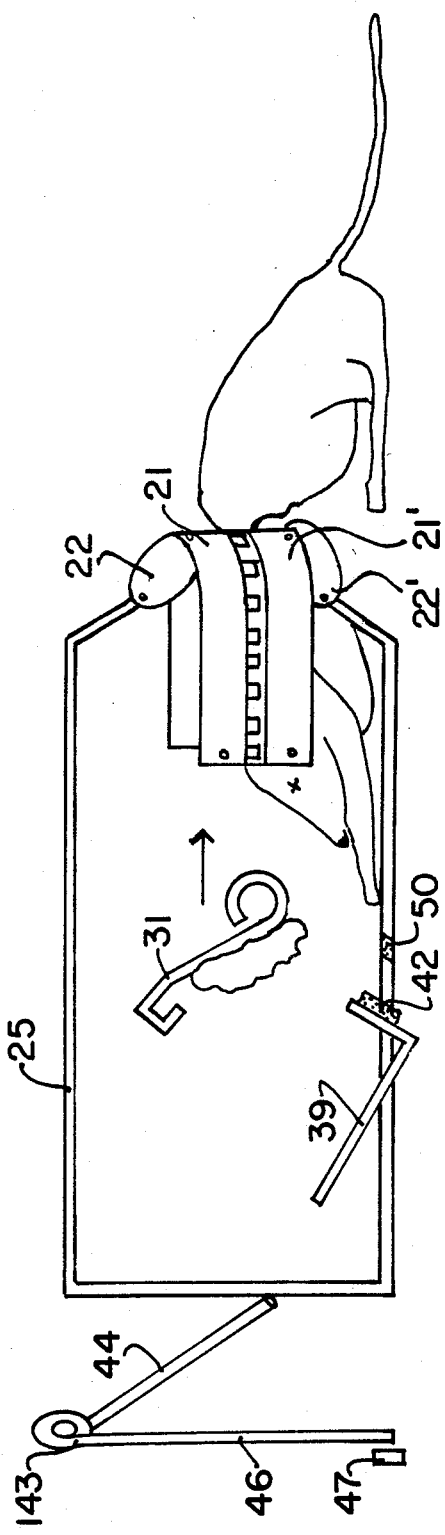

1

POSITIVE TRIGGER TRAP

TECHNICAL FIELD

This invention relates to a trap and more particularly to a trap for small game, rodents and reptiles.

BACKGROUND

There exists a host of different types and styles of traps. They are designed and used for such purposes as capturing the animal or destroying it.

Many of these traps present a safety hazard. For example, several traps, particularly those designed to deliver a lethal blow, can be accidentally triggered by an unintended victim. Numbered among such victims are water fowl, deer, curious children, unsuspecting adults and domesticated animals such as dogs, cats and goats. A family dog, for instance, may be attracted to the bait employed in a trap which as been set out for a rodent, resulting in a serious, if not fatal, injury to the dog. In addition to the potential for unintended injury, the very purpose for setting the trap is defeated if it is accidentally triggered.

SUMMARY OF THE INVENTION

It is apparent from the above that there exists a need in the art for a new trap which overcomes or mitigates the above-described problems. A purpose of this invention is to satisfy this need in the art, as well as other needs obvious to the skilled artisan once given the following disclosure.

Generally speaking this invention fulfils the abovedescribed needs by providing in a trap, (a) a housing having front and back ends, (b) a jaw means pivotally attached to the housing near the front end, (c) an elongated connecting means connnected to said jaw means, (d) means for tensioning said connecting means having a force vector directed toward the front of said housing, (e) a releasing means for releasably engaging said connecting means and (f) a trigger means contained within said housing releasably engaged with releasing means and positioned within said housing in a manner that upon pulling the trigger means toward the front end of the housing, the trigger means disengages from the releasing means which disengages from the connecting means where the tension thereon causes the jaws to pivot.

In such a mechanism, the trigger means requires a positive pulling force rather than a pushing force to spring the trap. This greatly reduces the risk of unintended injury as will be more fully described in the following, more detailed description of certain embodiments of this invention as shown in the accompanying drawings, wherein:

BRIEF DESCRIPTION OF THE DRAWINGS

FIG. 4 is a cutaway side view of the invention in a set position.

FIG. 5 is a front view of the trigger assembly along line 5—5 in FIG. 4.

FIG. 8 is a schematic view of a rat entering the trap.

FIG. 9 is a schematic view of the sprung trap and rat.

FIG. 10 is a back view of the invention with an optional spring tension release mechanism in the secured position.

FIG. 11 is a view of the release mechanism in an intermediate releasing stage.

FIG. 12 is a view of the releasing mechanism when released.

FIG. 13 is a side view of the releasing mechanism as shown in FIG. 12.

DETAILED DESCRIPTION OF THE ILLUSTRATED EMBODIMENT

Figure 1:
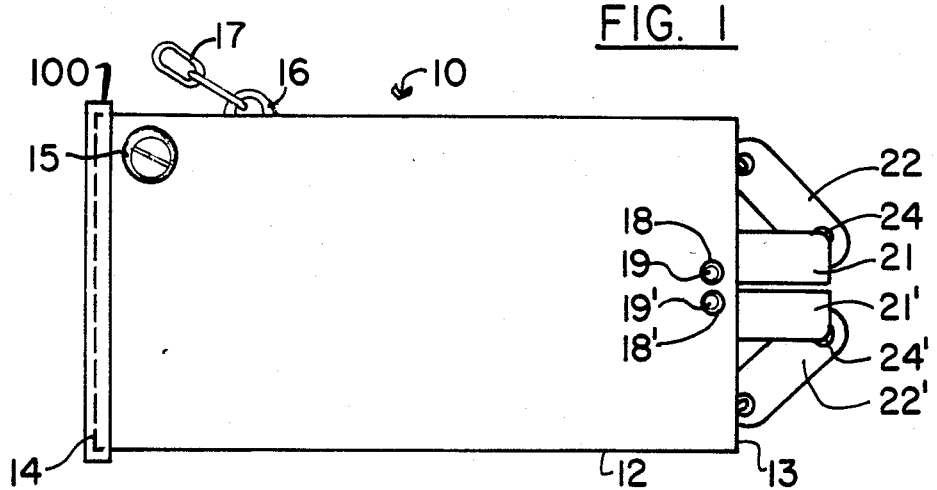
FIG. 1 is a side view of the invention.
Figure 2:
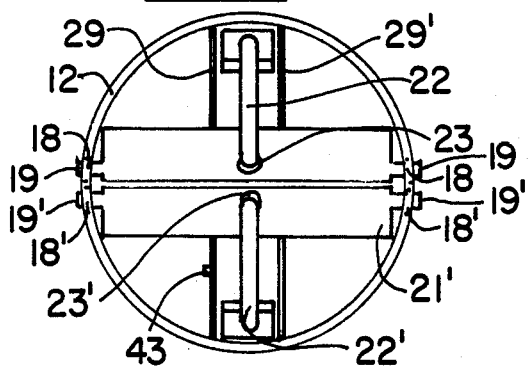
FIG. 2 is a front view of the invention.

FIG. 1 illustrates a trap 10 with rounded, tubular housing 12 which by way of example, may have a length of six inches and a diameter of three inches. Housing 12 is constructed of conventional material such as one-sixteenth inch thick steel presenting a generally smooth, continuous, annular exterior surface having an open front end 13 and open back end 14.

Slightly elongated hole 15 (whose purpose is described below) and eyelet 16 are located near back end 14 along housing 12. Eyelet 16 is adapted to receive chain 17 to secure trap 10 in a selected location.

Positioned (e.g. approximately one-quarter inch) from front end 13 are two pair of holes 18 and 18' on opposite sides of housing 12. Holes 18 and 18' secure jaw extensions 19 and 19' which are journaled in their respective holes 18 and 18'. In this respect, upper jaw 21 and lower jar 21' extend across the diameter of housing 12 at open end 13 and are fixed by extensions 19 and 19', within holes 18 and 18'.

Yoke bars 22 and 22' are perpendicularly connected to jaws 21 and 21' respectively. In order to provide a rotatable or pivotal connection, yoke bars 22 and 22' pass through holes 23 and 23' at substantially the midpoints of jaws 21 and 21' by way of holes 24 and 24' near the outermost end of yoke bars 22 and 22' respectively.

Figure 3:
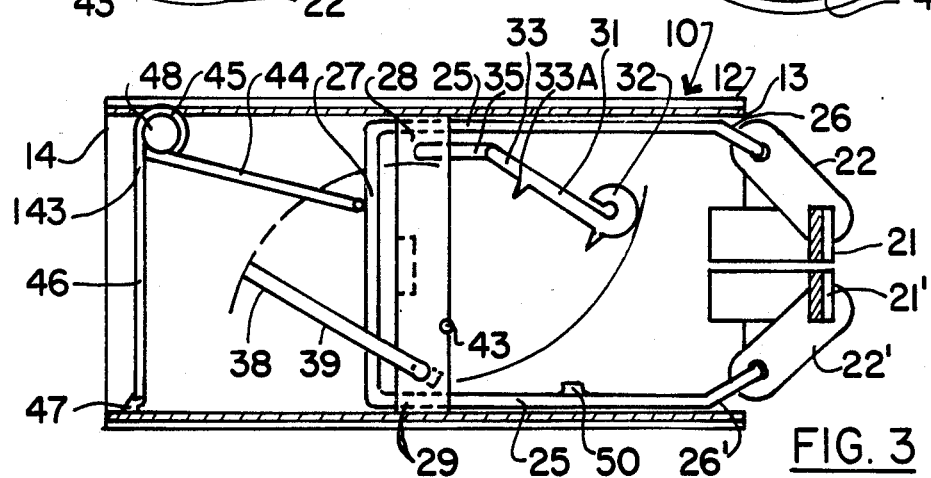
FIG. 3 is a cutaway side view of the invention in a sprung or actuated position.

FIG. 3 illustrates the interior of trap 10 in its actuated spring position. Jaws 21 and 21' are in abutting relationship. Yoke bars 22 and 22' extend from the outer periphery of front end 13 to jaws 21 and 21'. At their opposite ends, yoke bars 22 and 22' are rotatably connected to beveled ends formed on elongated legs 26 and 26' of the U-shaped yoke 25, in substantially the same fashion as bars 22 and 22' are connected to jaws 21 and 21'. U-shaped yoke 25 is short in width (e.g. one-half inch wide) and may be formed of conventional material such as three-sixteenth inch thick steel. As illustrated, bottom 27 of the "U" is of a length slightly less than the inside diameter of housing 12 so that yoke 25 may slide relative thereto.

Extending across the approximate midpoint of the interior of housing 12 is trigger assembly support 28 illustrated in greater detail in FIG. 5 (where the trigger mechanism is shown in its "ready to spring" position). Support 28 includes two steel rails 29 and 29' attached (e.g. welded) to the interior of housing 12 in a manner to provide a channel therebetween through which yoke 25 may slide. Cross-support member 30 is attached (e.g. welded) to rails 29 and 29' along the center portion of the channel to provide additional strength to the trigger assembly.

The trigger assembly includes rod 31 having a hook section 32 extending toward front end 13 and leading to straight portion 33 having bait barbs 33A extending toward back end 14. Elbow section 34 projects perpendicularly from portion 33 and rail 29' to portion 35 which slopes back toward rail 29' but perpendicular to section 34. Another perpendicular bend leads to section 36 which extends across support 28 through holes provided in rails 29 and 29' so that trigger 31 may pivot relative thereto. Short extension 37 projects downwardly and perpendicuarly from section 36 at the same slope portion 35 extends upwardly, and is engagable with end 38 of yoke release rod 39.

Yoke release rod 39 is an L-shaped member comprising elongated portion 40 and cross section 41 which passes through holes in rails 29 and 29' to render it pivotable in respect to support 28. Lug 43 extends a short distance from the bottom of section 42 between rails 29 and 29'. Lug 42 serves a dual purpose. First, it prevents section 41 from dislodging from support 28. The second will become apparent below. Stop lug 43 project laterally from the front edge of rail 29. Lug 43 positioned to prevent yoke release rod 39 from pivoting beyond the edge of rail 29. Rod 39, otherwise is free to pivot to the interior surface of housing 12 toward back end 14.

Figure 6:
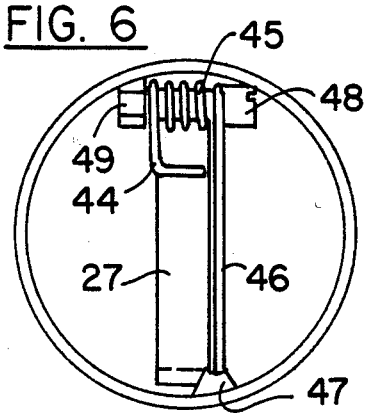
FIG. 6 is a back view of the invention.

As noted, FIG. 3 illustrates trap 10 in its sprung or actuated position. Tension spring 143 applies force to yoke 25 with leg 44 which abuts yoke section 27. L-Shaped leg 44 extends from helical portion 45 and terminates with leg 46 (depicted more clearly in FIG. 6). Leg 46 is releasably engaged with stop member 47 which is welded to the opposite interior surface of housing 12 and is of a concave configuration to securely hold leg 46.

Helical spring section 45 forms a longitudinal channel adapted for bolt 48. Bolt 48 is secured to the housing near back end 14 by welded nut lug 49 thereby imparting a pivotal relationship between spring 143 and housing 12. Hole 15, mentioned earlier, permits the removal of bolt 48 for convenient replacement of spring 143 should it be necessary.

FIG. 4 illustrates trap 10 in a set position. FIG. 8 corresponding to FIG. 4, illustrates only the moving parts of the trap and a rat, attracted to baited trigger 31, entering the trap. Jaws 21 and 21' pivot to become recessed along the periphery of the interior of housing 12 when yoke 25 is locked in its rear most position. Trigger 31 is positioned so that portion 33 is parallel with support 28. End portion 37 is angled just slightly toward front end 13 and angularly abuts end 38 of yoke release rod 39 which abuts stop lug 43. Lug 42 below leg 41 of yoke release rod 39 abuts projection 50 on yoke leg 26'. Spring leg 44 abuts yoke 25 along back section 27 and spring leg 46 is locked into stop member 47. The result of this position is to place a significant amount of tension onto yoke 25 by spring 143. Yoke 25 and therefore jaws 21 and 21' are locked into position by projection 50 abutting lug 42 which is held in its position by the cammed abutment of trigger 31 and release rod 39.

FIG. 3 and FIG. 9 depict the trap after it has been sprung by its prey. The trap is sprung by a pulling force on trigger 31 which when pivoted toward front end 13 allows yoke release rod 39 to pivot toward back end 14. Once the locking relationship on yoke release rod 39 is broken, the tension on yoke 25 from spring 143 causes yoke 25 to slide forward within the chamber. By virtue of the rotatable connection between jaws 21 and 21' and yoke 25 provided by yoke bars 22 and 22' respectively, jaws 21 and 21' pivot and snap onto each other. FIG. 3 illustrates the sprung position of trap 10 and also indicates that spring leg 44 abuts yoke 25 even after the trap has been sprung, thus some tension still remains on jaws 21 and 21' so as to prevent the victim from freeing itself.

Figure 7:
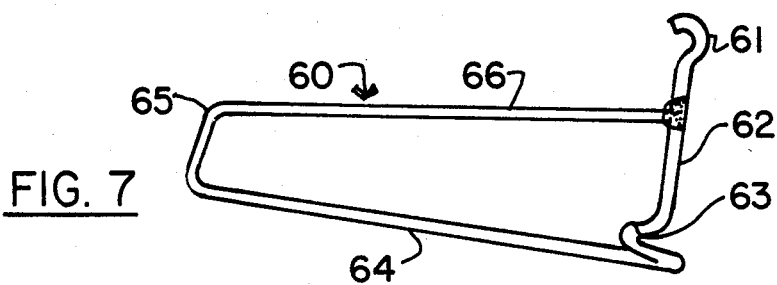
FIG. 7 is a view of a setting tool especially adapted for use with this invention.

FIG. 7 illustrates tool 60 specifically contrived for setting the trap. Tool 60 is made of one-eighth inch diameter steel rod. It includes hook 61, specifically adapted to be inserted and engage hole 15 in housing 12. Straight portion 62, about two inches long leads to indented section 63 which is adapted to engage the lower section spring 46. The plane formed by indented section 63 is perpendicular to the plane formed by hook 61. From indented section 63, the tool bends around to form projection 64, which is approximately six inches long, in a plane perpendicular to that of section 63, and slightly skewed for the plane formed by hook 61. The rod forms an approximate eighty degree angle in the same plane to form gripping section 65 which is about two to three inches long. The rod again bends at approximately an eighty degree angle where section 66 triangulates back and is welded to the approximate mid point of section 62.

By this configuration spring 143 can be brought into a set position from the unset position indicated by the dotted lines in FIG. 4. When trigger 31, yoke release rod 39 and yoke 25 are in the respective positions indicated in FIG. 4, hook 61 is inserted through hole 15 from the interior of housing 12. The base section of spring leg 46 is then caught in indented section 63. Force is used to pivot tool 60 about hole 15 and to lodge spring leg 46 into stop member 47.

FIGS. 10–13 illustrate various aspects of an optional release mechanism which can be substituted for stop member 47. Primarily, the release device is designed to be attached to the back end of the trap and to permit an animal to escape. Of course, the principal nature of the trap is to catch and or destroy intended victims. However, undesired and unintended victims may get caught. In such a case, it is desirable to provide an escape provision for those victims. The following scenario depicts the purpose of the optimal device. A dog accidentally gets a paw caught in the trap. The dog, not having been dealt a lethal blow, possesses sufficient size and strength to move both itself and the trap. It is this capacity for movement that will ultimately free the dog. In FIG. 1, trap 10 is shown having chain 17 linked to lug 16 where chain 17 is anchored elsewhere. In this case movement of the trap is futile. It merely exhausts the victim. However, if anchor chain 17 is connected to the contemplated release device rather than lug 16, pulling on the trap with sufficient force will release trap jaws 21 and 21' thereby freeing the victim. The particulars of the device are outlined below.

Releasing device 70 is attached within the back end of trap 10. In this case, releasing device 70 is welded to the interior of housing 12 opposite bolt 48 and behind yoke bottom 27. Releasing device 70 is composed of three major pieces: C-Shaped mounting member 72, anchor chain attachment member 74 and tension spring abutting member 76.

In the preferred embodiment, member 72 is welded to housing 12 and is constructed of a strong and rigid material such as steel or high density plastics. Member 72 includes an upper and a lower matched hole sets (not shown) which pass through both the truncated vertical extensions and the major leg. The holes permit members 74 and 76 to be pivotally secured to member 72.

Anchor chain attachment member 74 passes through the upper set of holes in member 72. Member 74 is composed of two sections, J-shaped section 78 and elongated chain attachment section 80. The major leg of J-shaped portion 78 passes through and is rotatably attached to mount member 72. Shown welded here, section 80 projects perpendicularly from the major leg of portion 78 and between the upper hook portion of C-shaped member 72. Section 80 parallels the major leg of member 72 and terminates at open eye member 82. It is this eye member that permits a chain to be attached to the device.

L-shaped member 76 includes upper leg portion 84 constructed to parallel the outside of the major leg of member 72 and to fit within the opening provided by J-shaped portion 78. Horizontal J-shaped section 86 of member 76 passes through the lower set of holes provided in member 72. Hook-like end 86 of section 86 serves to releasably engage spring arm 46. In FIG. 10, spring portions 44, 45 and 46 and therefore yoke portion 27 are tensioned. However, when releasing device 70 is actuated, the tension is released.

FIGS. 11 and 12 serve to better illustrate the interaction of pieces 72, 74 and 76 during the releasing sequence. Member 74 is rotated by application of pulling force by a cable or chain (not shown) attached to eye member 82. Once rotated, J-shaped portion 78 is disengaged from the end of upper leg portion 84. It should be noted that portion 84 includes notch 85 which is complementary with and adapted to fit the cross section of portion 78.

Due to the force applied to the minor leg of hook end 88 by spring 46, member 76 pivots toward the back of the trap, Once disengaged from end 88, spring 46 is completely released thereby eliminating any spring tension from the yoke 25 and therefore jaws 21 and 21'. Without tension jaws 21 and 21' may be opened with ease and the victim may extricate itself from the trap.

Some modifications of the trap as described in the preferred embodiment include the use of toothed jaws or enlargement for larger prey. The positive trigger is a feature that can prove useful in many traps designed for a variety of purposes. As illustrated in FIG. 1, cover 100 may be used over the back to prevent tampering and to protect the internal mechanism of the trap from inclement weather, ice, mud, etc. The trap may be constructed of galvanized steel or other rugged rust-proof materials so it may be employed in an aquatic environment.

Other modifications and designs should now be obvious to those of skill in the art and are intended to fall within the scope and intent of this invention as defined by the following claims.

I claim:
1. In a trap:
(a) a housing having a front and back ends;
(b) a jaw means pivotally attached to said housing near the front end;
(c) an elongated connecting means connected to said jaw means and substantially recessed in said housing;
(d) means for tensioning said connecting means having a force vector directed toward the front of said housing;
(e) releasing means for releasably engaging said connecting means; and
(f) recessed trigger means contained within said housing releasably engaged with said releasing means and positioned within said housing in a manner that upon pulling said trigger means toward the front end of said housing, the trigger means disengages from said releasing means which disengages from the connecting means where the tension thereon causes said jaws to pivot.

2. A trap according to claim 1 wherein said jaw means include two oppositely disposed coacting jaws which recess within the front end of said housing when the trap is set and project from said front end when the trap is sprung.

3. A trap according to claim 2 further comprising tension releasing means for releasing tension on said connecting means thereby permitting said jaws to pivot freely, said tension means being securely affixed to the back end of said housing and capable of at least a first and a second position where said tension releasing means is engaged with said tensioning means in said first position and is disengaged from said tensioning means in said second position.

4. A trap according to claim 3 wherein said trigger means is an elongated trigger means connected to said housing in a manner to pivot toward the front end of said housing.

5. A trap according to claim 4 further comprising said releasing means being elingated and having one end releasably engage said trigger means and the other end releasably engage said connecting means whereby pivoting said trigger means disengages said trigger means from said releasing means which disengages from said connecting means.

6. A trap according to claim 5 said elongated connecting means further comprising a U-shaped yoke having two elongated legs slidable within said housing and each of said legs is connected to one of said jaws.

7. A trap according to claim 6 said means for tensioning further comprising a spring secured to said housing and engagable with said yoke.

8. A trap according to claim 7 further comprising barbs on said trigger means for securing bait.

9. A trap according to claim 8 further comprising a cover adapted to seal said back end.

10. In a trap:
(a) a circular, elongated, tubular housing having a substantially solid wall and an open front end,
(b) swingable means for obstructing the front end, said means being pivotally mounted within and adapted to swing across the front end,
(c) recessed trigger means within said housing, connected thereto and adapted to be pulled toward said front end,
(d) recessed releasing means adapted to releasably engage said trigger means,
(e) recessed connecting means in slidable relationship with said housing connected to said pivotal swingable means, and releasably connected, to said releasing means, and
(f) recessed force means for applying force to said connecting means directed toward said front end,
(g) where pulling said trigger means toward said front end disengages said trigger means from said releasing means which disengages said releasing means from said connecting means and said force means cause said connecting means to slide relative to said housing which in turn causes said swingable means to pivot and obstruct said front end.

11. A trap according to claim 10 wherein said housing being of sufficient size to contain prey.

12. A trap according to claim 11 wherein said force means comprise a spring to apply force to said connecting means.

13. A trap according to claim 12 said connecting means including a first connecting means, and a second connecting means pivotally connected to said first connecting means at one end and pivotally connected to said swingable means at the other end.

14. A trap according to claim 13 wherein said swingable means is semi-circular.

15. A trap according to claim 14 wherein said trigger means includes an elongated trigger having barbs for securing bait, said trigger being pivotally mounted within said housing so that pulling on said trigger causes said trigger to pivot and thereby disengage said releasing means.

16. In a trap for small animals, rodents and reptiles,
   (a) a tubular housing having a front and a back end,
   (b) a first and a second coacting jaws, each of said jaws pivotally mounted to and across the front end of said housing,
   (c) a first and a second yoke bar, said first yoke bar being rotatably attached and perpendicular to said first jaw and said second yoke bar being attached in the same fashion to said second jaw,
   (d) a U-Shaped yoke member having a first and second elongated legs and a base having a length less than the length of the diameter of said housing, said yoke being contained within and in a slidable relationship with said housing and said first leg being rotatably connected to said first yoke bar and said second leg being connected in the same fashion to said second bar,
   (e) a support member permanently affixed and extending across the interior of said housing and further providing a channel through which said first and second legs may slide,
   (f) an elongated yoke release means having a first and second end, said first end being pivotally attached to said support member in a manner to permit pivoting toward said back end of said housing,
   (g) a trigger means pivotally attached to said support member and releasably engaged with said second end of said yoke release member in a manner to permit said trigger means to pivot toward said front end of said housing, and
   (h) a spring means connected to said housing, and adapted to engage the base of said yoke and apply force directed toward said front end thereto,
   (i) whereby pivoting said trigger means releases said yoke release means which in turn releases said yoke which slides forward within said housing caused by force applied by said spring means and causes said jaws to swing closed across the front of said housing.

17. A trap for small animals, rodents and reptiles according to claim 16 wherein said jaws are semi-circular jaws.

18. A trap for small animals, rodents and reptiles according to claim 17 wherein said jaws are toothed jaws for killing when the trap is sprung.

19. A trap for small animals, rodents and reptiles according to claim 18 wherein said trigger means being a barbed trigger for securing bait.

20. In a trap:
   (a) a housing having a front and back ends;
   (b) two oppositely disposed coacting jaws pivotally attaced and recessed within the front end of said housing when the trap is set and which project from said front end when the trap is sprung;
   (c) an elongated connecting means connected to said jaw means;
   (d) means for tensioning said connecting means having a force vector directed toward the front of said housing;
   (e) a releasing means for releasably engaging said connecting means;
   (f) elongated trigger means connected to and contained within said housing in a manner to pivot toward the front end thereof, said trigger means releasably engaged with said releasing means and positioned within said housing in a manner that upon pulling said trigger means toward the front end of said housing, the trigger means disengages from said releasing means which disengages from the connecting means where the tension thereon causes said jaws to pivot; and
   (g) tension releasing means for releasing tension on said connecting means thereby permitting said jaws to pivot freely, said tension means being securely affixed to the back end of said housing and capable of at least a first and a second position where said tension releasing means is engaged with said tensioning means in said first position and is disengaged from said tensioning means in said second position.

21. In a trap:
   (a) a circular, elongated, tubular housing of a sufficient size to contain prey having a substantially solid wall and an open front end,
   (b) swingable means for obstructing the front end, said means being pivotally mounted within and adapted to swing across the front end,
   (c) trigger means within said housing, connected thereto and adapted to be pulled toward said front end,
   (d) releasing means adapted to releasably engage said trigger means,
   (e) first connecting means in slidable relationship with said housing,
   (f) second connecting means pivotally connected to said first connecting means at one end and pivotally connected to said swingable means at the other end,
   (g) spring means for applying force to said first connecting means directed toward said front end, and
   (h) where pulling said trigger means toward said front end disengages said trigger means from said releasing means which disengages said releasing means from said connecting means and said force means cause said first connecting means to slide relative to said housing pivoting said second connecting means which in turn causes said swingable means to pivot and obstruct said front end.

* * * * *